United States Patent [19]

Szendrödi et al.

[11] 4,403,803
[45] Sep. 13, 1983

[54] PASSENGER AND LUGGAGE TRANSFER SYSTEM

[75] Inventors: Valer Szendrödi; Gyula Radics; Tivadar Varga; Tibor Vass; Karoly Gyurics, all of Budapest, Hungary

[73] Assignee: Ikarus Karosszeria es Jarmügyar, Budapest, Hungary

[21] Appl. No.: 261,644

[22] Filed: May 7, 1981

Related U.S. Application Data

[63] Continuation-in-part of Ser. No. 107,660, Dec. 27, 1979, Pat. No. 4,355,840.

[51] Int. Cl.³ .............................................. B64F 1/31
[52] U.S. Cl. .................................. 296/179; 296/178; 414/390; 414/398
[58] Field of Search ............... 296/178, 179; 414/373, 414/390, 398; 244/137 R, 137 P

[56] References Cited

U.S. PATENT DOCUMENTS

| 3,123,167 | 3/1964 | Lichti | 296/179 |
| 3,498,480 | 3/1970 | Gutridge | 414/398 |
| 3,524,558 | 8/1970 | Mastracci et al. | 414/390 |
| 3,606,250 | 9/1971 | Sherman | 296/179 |
| 3,805,704 | 4/1974 | Sehauffler | 244/137 R |
| 4,097,008 | 6/1978 | Penjer | 244/137 P |

FOREIGN PATENT DOCUMENTS

| 921163 | 4/1947 | France | 296/179 |
| 383182 | 12/1964 | Switzerland | 296/179 |

Primary Examiner—Richard A. Bertsch
Attorney, Agent, or Firm—Karl F. Ross; Herbert Dubno

[57] ABSTRACT

A passenger and luggage handling system for an air terminal utilizes a unique bus-type vehicle according to the invention which has a passenger compartment in the elongated body which is separated from the luggage compartment extending longitudinally therealong, preferably beneath the passenger compartment. At one end of the vehicle the passenger compartment has an elevatable stairway having a member which can be lifted strictly vertically to the height of the aircraft door, thereby entraining a corresponding number of steps of the stairway also strictly vertically. The luggage compartment is provided with means, e.g. a conveyor, for moving the luggage through this compartment or into and out of the compartment.

15 Claims, 8 Drawing Figures

PASSENGER AND LUGGAGE TRANSFER SYSTEM

CROSS REFERENCE TO RELATED APPLICATIONS

The present application is a continuation-in-part of our application Ser. No. 107,660 filed Dec. 27, 1979 (now U.S. Pat. No. 4,355,840), and also is related to the commonly owned copending application Ser. No. 183,928 filed Sept. 3, 1980 by two of the present joint inventors.

FIELD OF THE INVENTION

The present invention relates to a closed vehicle and related equipment for managing services at airports, especially for transporting the passengers together with their luggage from a given area to the airplane and, more particularly, for improving services relating to the administration of the passengers and manipulation of the luggage at airfields, thereby simultaneously increasing the passenger handling capacity of the airfield.

BACKGROUND OF THE INVENTION

As is well known, at airports the passengers and their luggage at the place of check in, are separated from each other; as a consequence, passengers and luggage each go their own ways.

One of the drawbacks of this kind of service is that automation has not been possible; as a consequence, the manual work has required a large staff. Administration of passenger transfer takes place at a reduced speed and due to frequent errors, reliability is rather dubious. Finally the capacity of the airplanes relating to the number of the passengers to pass is always less than the normal capacity. To make matters worse, seasonal fluctuation always results in confusion, mainly in peak travel periods.

According to international estimation, not even the most up-to-date computer-controlled system has been able to ensure 99% safety in routing the luggage even during peak hours when personal intervention beside the computered control has been provided.

It is also well known, that at the prevailing passenger service systems, where computer control is generally used, loading of the luggage is performed manually. In manual operation—due to frequent sorting and loading—damage to the luggage is unavoidable. A further disadvantage of manual luggage handling is that actions endangering the safety of the flight cannot be avoided.

Presently the transmitting capacity of airports is adversely affected by the complexity of the passenger flow, utilizing different corridors and gates.

In order to reduce these drawbacks the so-called plane-mate system and similar systems of the passenger transport have been proposed. The essence of these systems is that the passenger do not walk through different corridors to the airplane but after the requisite administration of the passengers and delivery of the luggage, the passengers are transported in a special passenger carriage to the airplane. The passenger space is lifted to the door height of the airplane, and the passengers may go directly to the airplane from the closed passenger carriage.

The system described has certain disadvantages. The main disadvantage is that the luggage travels along a separate path to the airplane. Since—as is well known—managing of the luggage requires much more time than passenger administration, the time needed for handling the luggage will determine the transmitting capacity of the airport.

A further disadvantage is that lifting and lowering the complete passenger carriage is slow and time-consuming operation, requiring a complicated and expensive structure. Due to its width, amounting to 3.5 to 5 m, the vehicle can traffic public roads only by observing the prescriptions valid for vehicles of special size. As a consequence, the vehicle cannot be used for transporting a group of passengers from a given place outside the airport to the airplane while travelling on a public road.

Various proposals have been made to separate baggage from passengers in air travel arrangements and even to provide transport of passengers to an aircraft in a bus-type vehicle with an elevatable stairway.

As far as we are aware, these systems are less than satisfactory for the reasons already mentioned. The vehicle systems themselves are also frequently inconvenient because practically in all cases the elevation and lowering of the exit end of the stairway imparts an arcuate movement thereto complicating the alignment of the door of the vehicle with the door of the aircraft and with the terminal passage ways when either the terminal passage ways or the aircraft doors may be on various levels at different occasions.

OBJECTS OF THE INVENTION

The principal object of the invention is to provide an improved system of passenger transport whereby disadvantages of the system considered as the most modern system up-to-now are avoided.

Another object is to increase transmitting capacity of a given airport in such manner that the passengers and their luggage are simultaneously transported on the same path over a shortened period to the airplane, but nevertheless separated from each other.

It is also an object to provide a fully mechanized handling and manipulation of the luggage, beginning from the acceptance to loading into the airplane itself.

It is also an object to provide a system which utilizes a vehicle whose size does not surpass that of the busses currently in use on public roads, and which can transport passengers into the airplane without the necessity of change, simultaneously avoiding lifting of the complete passenger space of the vehicle body.

It is yet another object of this invention to extend the principle set forth in the above mentioned copending applications to an improved bus-type vehicle for use in an improved passenger and luggage handling system at airports.

The program outlined above is enumerated among the tasks and problems to be solved in the future on pages 2, 3 and 7 of the dissertation published by the Information Center of Aviation LRI 1.4/1977.

SUMMARY OF THE INVENTION

The invention provides a closed vehicle, preferably a bus for the direct transport of passengers and their luggages from a given area to the airplane. The luggage space and the passenger space of the closed vehicle are well separated from each other.

An essential of the invention is that a part of the passenger space forms a stair construction, the height of which can be optionally adjusted. The luggage space is formed along the longitudinal centerline of the vehicle below the passenger space and stair construction.

The stair construction is provided with a lifting device, which is fixed to the stair-step to be lifted to the highest point. Between the elements connecting the steps following each other the possibility of a vertical restricted displacement is given, by means of which the geometry of a stair known per se can be realized. The attainable maximum height of the flight of stairs is determined by the number of stair-steps used.

According to one of the preferable embodiments of the invention the luggage space is arranged below the passenger space. The luggage space can be formed in such a manner too, that it should contain at least one transit path. In case of several transit paths these are separated from each other within the luggage space. Preferably, the closed vehicle should be formed in such a manner that the floors of the passenger space and the luggage space are flat (planar).

According to a further preferred embodiment of the invention both the passenger space and the luggage space are continuously arranged in the line of the longitudinal axis of the closed vehicle. Expediently, both the passenger space and the luggage space, but at least one of them, is provided at the frontal side with aperture closing means. Furthermore, the closed vehicle according to the invention may be formed in such a manner that either the passenger space of the luggage space or both are provided with an aperture and in a given case with aperture closing means arranged in lateral direction. The luggage space can be formed in a manner known per se, as a transient path for receiving containers and luggage sorting boxes.

The invention also relates to a complex equipment for managing services at the airport, for transporting the passengers and their luggage from the airport area into the space of the airplane and for developing the passenger and luggage service at airports; a further aim of the invention has been to increase the transmitting capacity of the airports by using the vehicle according to the invention or any other vehicle known in itself.

The room serving for administering the tickets and handling the luggage is connected to the room in which the passengers board the vehicle and to the space where the luggage is stored. The essence of the processing equipment is that the luggage-storing place includes several compartments separated from each other according to the single flights and each one of said compartments is arranged in the immediate vicinity of the place at which boarding for the flight in question takes place, expediently below them, but having been completely separated from them.

Between the spaces serving for the manipulation of the luggage and administration of the ticket and the luggage storing place, respectively, there are conveyor paths arranged to ensure direct connection and possibility of loading.

Between the space, where the passengers board the vehicle and the luggage-storing place and between the luggage-storing place of the airplane and the luggage-storing areas of the vehicle well-known conveying and loading equipment are arranged.

According to an important feature of the invention, the elevatable stairway at one end of the elongated body of the vehicle has a plurality of steps interconnected for relative vertical movement exclusively and preferably raised in respective compartments, i.e. forming part of ring-like or frame-like interconnected structures such that upon elevation of the step most distal from the passenger compartment, the opening or door of the vehicle can be lifted strictly vertical to the level of the door of the aircraft, thereby lifting each step behind this first step, in succession, through a lost-motion distance to thereby provide the elevatable stairway. This arrangement eliminates all arcuate movement of the elevatable stairway and ensures simple adjustment of the stairway height to any passageway level for entry to or egress from the passenger compartment of the vehicle.

The luggage space conveyor can be a belt-type conveyor or in the form of a plurality of wheeled carriages which enables the luggage to be introduced from one end of the vehicle into the luggage space or channel underlying the passenger space and to be moved from this end, the other end or both ends.

The advantages of the closed vehicle according to the invention are considerable:

Although the luggage and the passengers are separated from each other, spatially and timely passenger and luggage are simultaneously forwarded into the airplane.

From the moment of acceptance till the arrival to the airplane (included the loading of the luggage into the airplane) the whole process is automated and manual work is not required at all. The process takes place in a reliable and quick manner, whereby the transmitting capacity of the airport can be considerably increased even in seasonal peak-periods. Safety of routing can be also increased, i.e. possibility of errors may be eliminated. As repeated sorting and manipulation of the luggage becomes superflous, damages of the luggage—inevitable up-to-now—can be also avoided. Prevention of actions endangering the safety of flight can be executed to an increased extent.

It should be mentioned as a considerable advantage, that the sizes of the closed vehicle according to the invention do not exceed those of the busses used on public roads. As a consequence, traffice without special permission becomes possible. By the closed vehicle according to the invention the passengers and the luggages may be transported on public roads from any place lying remote from the airport directly to the airplane. A further advantageous feature is that direct transport of the passengers into the airplane takes place without lifting or lowering the entire passenger space, as a consequence, the task may be fulfilled by the aid of relatively simple means and quickly.

BRIEF DESCRIPTION OF THE DRAWING

The invention is described in greater detail with reference to the accompanying drawing in which.

SPECIFIC DESCRIPTION

Figure 1:
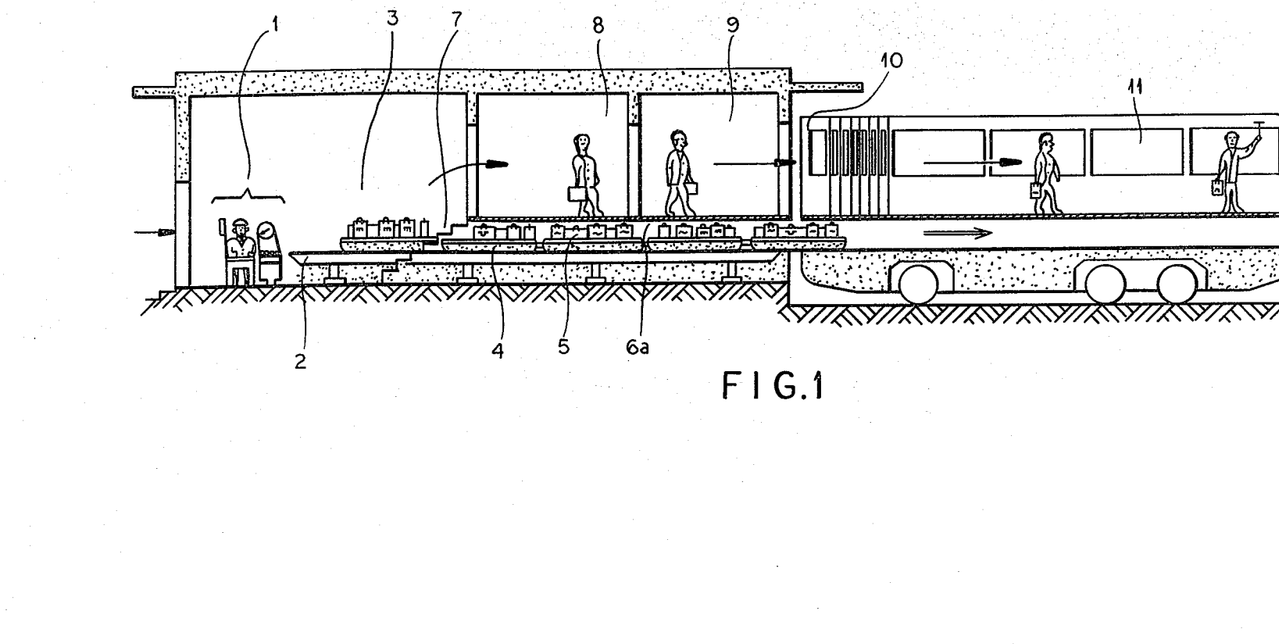
FIG. 1 is a diagrammatic elevational view showing schematically the passenger administration and closed vehicle according to the invention in course of loading the luggage and boarding of the passengers.

Referring to FIG. 1, a passenger checks in at the region 1, where passenger and luggage are processed. After having his tickets and luggage 5 processed, the passenger proceeds to the transit waiting hall 8 up the stairs 7. From the space 9—having been separated in accordance with the single flights—the passenger passes through the gate 10 directly into the passenger space 11 of the closed vehicle. At the same time, the luggage 5 having been processed in the space 1 is loaded at the place 3 into the empty container 4 arranged on the luggage routing path 2. The luggage 5 of the passengers of the single flights are collected in the loaded containers 4, whereas the container 4 are collected in the luggage space 6a below the space 9, from which the passengers board the vehicle. As is to be seen from the Figure, at the same time that the passengers board the closed vehicle, the containers are loaded into the luggage space 6b below the passengers space, in the direction indicated by the arrow. Transport of the containers 4 from the space at which passengers and luggage are processed to the place of loading is fully mechanized, by means of a conveyor belt, not illustrated here. Within the luggage space 6b of the closed vehicle the containers already loaded into said space are advanced also by means of a conveyor belt.

Figure 2:
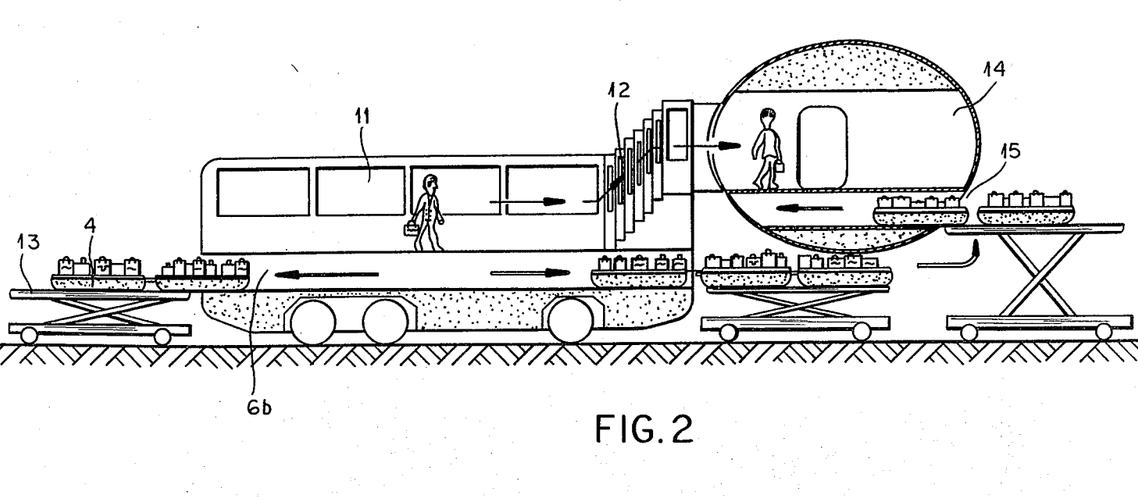
FIG. 2 is a similar diagrammatic view showing the airplane and the closed vehicle according to the invention, when the passengers are embarking and the luggage is transferred from the closed vehicle to the airplane in a fully automated manner.

As is to be seen from FIG. 2, the closed vehicle stops close to the embarkation aperture of the airplane, turning with its frontal side towards the aperture. A part of the passenger space 11 is formed with a flight of stairs 12, which is constructed in such a manner that it can be easily elevated; the passengers thus may directly enter the airplane. The flight of stairs 12 with the lifting device (not illustrated here) is constructed in the known manner.

In case of the preferred embodiment described here, the rod of the lifting device is fixed to the stairstep lying next to the passenger space of the airplane 14. The single stair-steps are fixed to each other by means of connecting elements known per se. The clearance of the displacement between the connecting elements corresponds to the desired height of the stair-step. The attainable maximal height of the stair will be defined by the number of the stair-steps provided.

From the luggage space 6b of the closed vehicle the containers 4 are placed onto the loader 13, from where they are advanced by known mechanized loading devices into the luggage space of the airplane.

In case of the embodiment described here the luggage space 6b if formed as one single transit path. It goes without saying, that within the closed vehicle several transit paths separated from each other can be formed.

As is to be seen from FIGS. 1 and 2, both the passenger space 11 and the luggage space 6b are formed with a plain floor. The figures show, that both the luggage space 6b and the passenger space 11 are formed continuously along the longitudinal axis of the closed vehicle. The passenger space 11 and the luggage 6b, or at least one of them should be provided with aperture closing means on the frontal side.

Both the passenger space 11 and the luggage space 6b, or at least one of them, can be provided with an aperture in lateral direction and in a given case aperture closing means may also be used. The luggage space 6b is formed as a transit path suitable for the receipt of the luggage sorting boxes and containers, respectively.

At the arrival of the airplane at the place of destination, transport of the passengers and loading of the luggage 5 is to be performed in a reversed sequence of operation.

Figure 3:
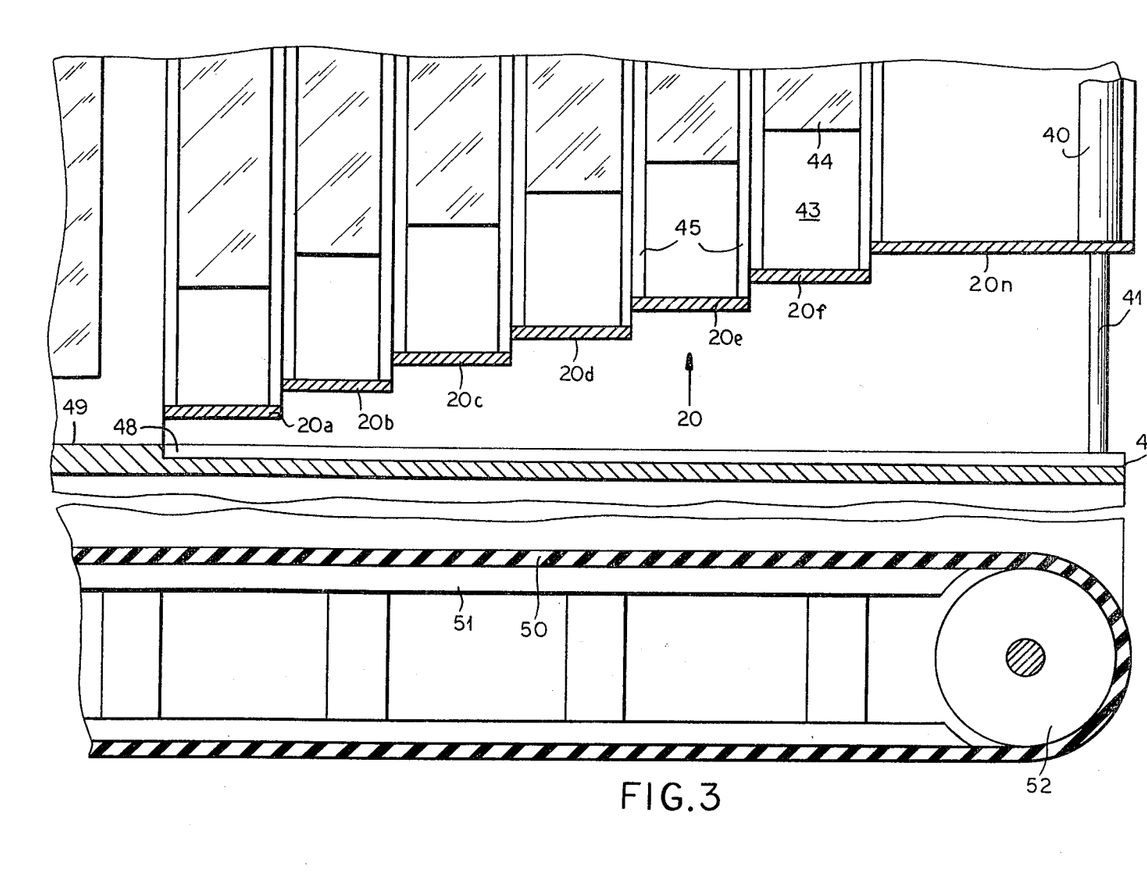
FIG. 3 is a cross-sectional view, also in diagrammatic form, illustrating the end of the vehicle provided with the elevatable stairway.

As can be seen from FIG. 3, the last step 20n of the flight of steps represented generally at 20 is vertically displaceable by a hydraulic jack arrangement which can comprises two hydraulic jacks flanking the passageway for the passengers and suitably concealed, of which one is shown at 40 in FIG. 3. The piston 41 of this hydraulic jack engages the chassis 42 of the vehicle and the steps 20a, 20b, 20c, 20d, 20e and 20f of the stairway are mutually interconnected so that each can be shifted vertically only. Each step 20a–20n forms part of a compartment or ramp, a side wall of which is represented at 43 and can have a window 44. In addition, the elevatable stairway can have a wall of its compartments reinforced by frame members 45.

Figure 4:
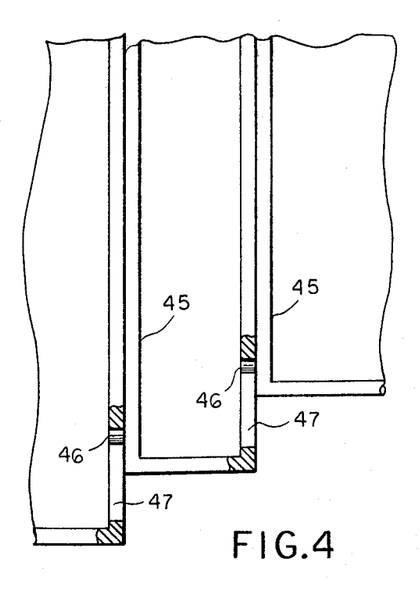
FIG. 4 is a detailed view of a portion of a frame structure forming the elevatable stairway of this invention.

As can be seen in FIG. 4, the frame members 45 of each upper step can have a rearwardly projecting pin 46 received in a vertical groove 47 of the next frame so that, with operation of the hydraulic jack 40, the step 20n is lifted vertically until its pin 46 engages at the top of the groove 47 of the next step 20f whereupon this step is lifted vertically without arcuate movement until its pins lift the following step 20e and the process continues until step 20f has become level with the aircraft passage way. Depending upon the height of this passageway, all or some of the steps will be lifted (compare FIG. 7).

In the luggage compartment, when the luggage is carried on skids as shown in FIGS. 1 and 2, a conveyor belt 50 can be provided which rides on a frame 51 and is driven by a roller 52 by an appropriate motor not shown. The steps 20a through 20n can be set into a recess 48 (FIG. 3) so that their upper surface is flush with the floor 49 of the passenger compartment 11.

Figure 5:
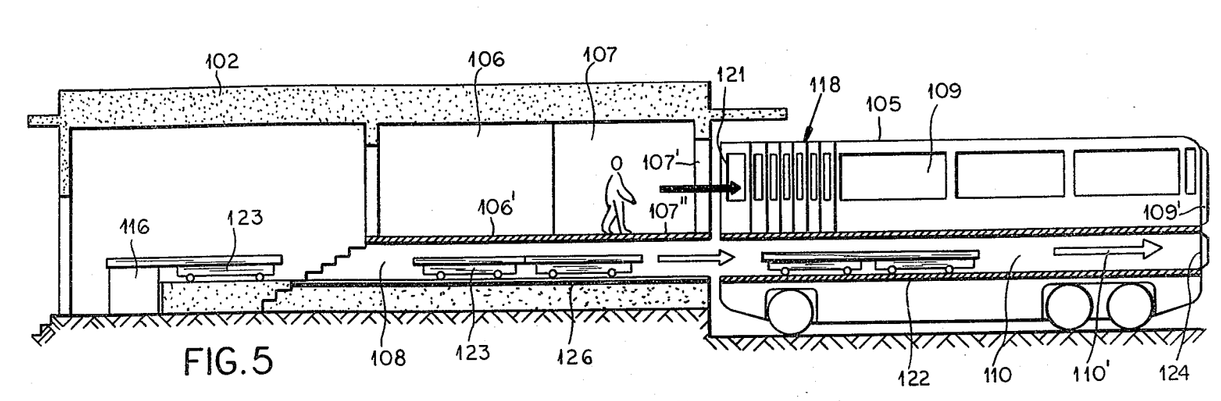
FIGS. 5 and 6 show, in view similar to FIG. 1, another arrangement in accordance with the present invention.
Figure 6:
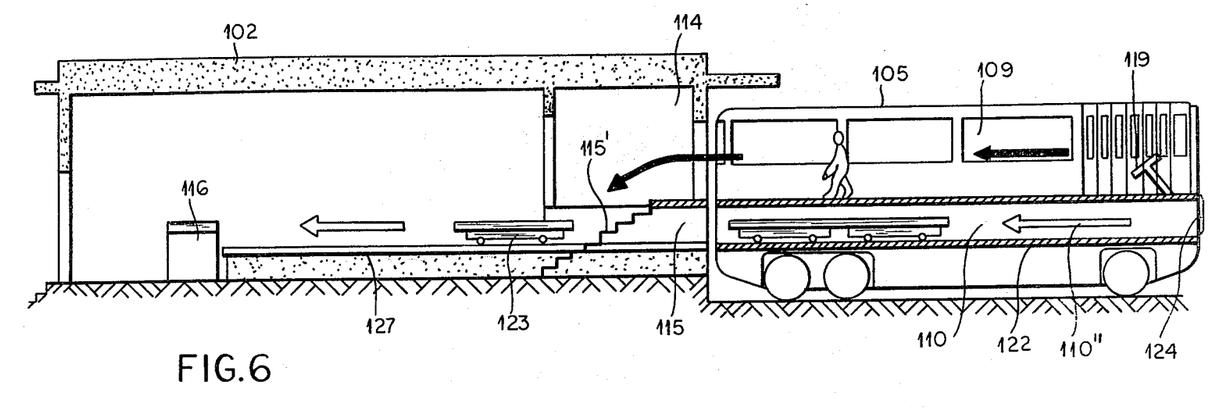
Figure 7:
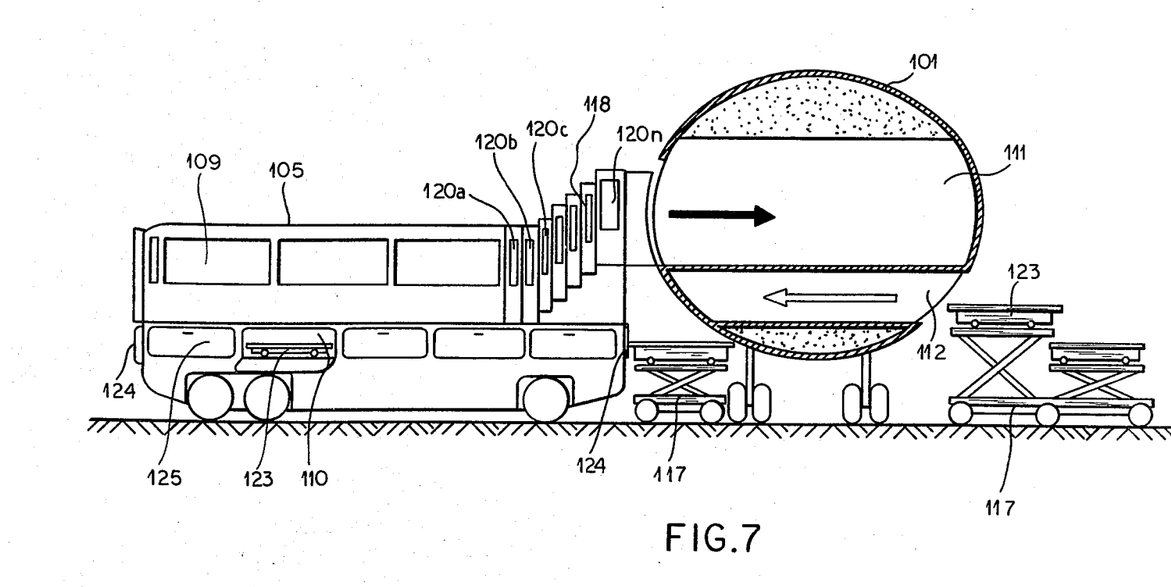
FIG. 7 is a view similar to FIG. 2 showing the principles of the latter embodiment.
Figure 8:
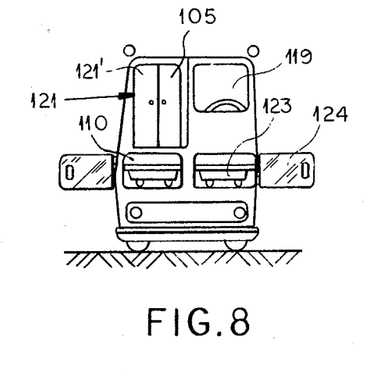
FIG. 8 is the end view of the vehicle used in the embodiment of FIGS. 5 through 7.

In FIGS. 5 and 6, a bus-type vehicle has been shown and the construction of this vehicle will be more fully apparent from the illustrations of FIGS. 7 and 8.

At the aircraft terminal 102, the passenger checks in at the weighing station 116 and the luggage is placed upon wheeled carriers 123 which can ride upon rails of the tracks and which form with these tracks a conveyor system within the terminal building 102. After flight security checks the passenger can remain in the waiting room 106 while his luggage is similarly secure in the passageway or tunnel 108 running beneath the floor 106' of the waiting room, the tracks being shown at 126.

At the time for boarding, the passenger can enter a chamber 107 whose door 107' communicates with the open doorway 121, which can be formed with closable force 121' (FIG. 8) in which position the elevatable stairway 218 has been lowered to align the floor of the passenger compartment with the floor 102' with the passageway 107. A door 124 at the left-hand end of the passenger and luggage carrying vehicle is opened or removed and the passageway 108 is aligned with the luggage compartment 110 extending the full length of the vehicle and likewise provided with tracks 122 so that the carriages 123 can roll directly into the vehicle in the direction of the arrow 110'. The passenger meanwhile enters the passenger compartment 109 above the luggage compartment.

The door 121 can then be closed and the vehicle, which has a compartment 119 for the driver flanking the stairway, can be driven to the aircraft.

When a vehicle 105 is to discharge passengers at the terminal, the passenger compartment 109 can be backed to the passage 114 of the terminal 102 and a rear door 109' opened to allow agress while the baggage carriers are fed from the luggage compartment 110 through the passages 115 on a track 127 flanking the stairway 115' to allow the passengers to pick up their luggage from the carriers.

Note that the arrows 110 and 110' showing the direction of luggage movement in FIGS. 5 and 6 correspond to the same direction.

When the vehicle reaches the aircraft (FIG. 7) the wheeled carriers can be shifted on to the cart 117 and raised to or lowered from the luggage compartment 112 or hold of the aircraft while the elevatable stairway 118 is raised to communicate with the passenger compartment 111 of the aircraft 101. The side doors 125 afford access to the luggage compartment along the length thereof of the bus 105 and ensure proper loading and unloading.

In FIG. 7, the step compartment 120a and 120b has not been lifted while compartments 120c–120n have been elevated.

We claim:

1. An airport boarding and deplaning bus, comprising an elongated self-propelled vehicle body formed with a passenger compartment extending at least over a major portion of the length of said body, a driver compartment at a front end of said body and an elevatable stairway adjacent said driver compartment at said front end of said body, said elevatable stairway comprising a doorway adapted to be disposed substantially in alignment with said passenger compartment during travel of the bus but elevatable with said stairway for alignment with a doorway of an aircraft, said elevatable stairway comprising a step most distal from said passenger compartment and formed at the bottom of said doorway of the bus, a succession of other steps of generally similar width lying between said distal step and said passenger compartment, means interconnecting said steps whereby elevation of said distal step will successively raise the steps disposed successively inwardly from said distal step toward said passenger compartment; and means for shifting said distal step on said body substantially vertically to raise said steps and the doorway of said bus and thereby form a staircase running between said passenger compartment and said doorway of said aircraft at said front end of said body adjacent said driver compartment.

2. The bus defined in claim 1 wherein said body is formed with a luggage compartment extending the full length of said body beneath said passenger compartment and said stairway, and doors for closing said luggage compartment at opposite ends of said body.

3. The bus defined in claim 1 wherein each of said steps is formed with an annular frame with a width substantially corresponding to the width of the respective step and defining a respective compartment of said stairway.

4. The bus defined in claim 1 wherein each of said steps in a lowered position of said stairway has an upper surface flush with the upper surface of the floor of said passenger compartment.

5. The bus defined in claim 2 wherein the luggage compartment is formed with means carried by said body for displacing luggage along the length of said compartment.

6. The bus defined in claim 5 wherein said means for displacing luggage is a track, said bus further comprising carriages within said luggage compartment receiving said luggage and riding on said track.

7. The bus defined in claim 5 wherein said means for displacing luggage is a belt-type conveyor.

8. The bus defined in claim 2, further comprising doors spaced along at least one side of said body over the length thereof for affording access to said luggage compartment.

9. A boarding and deplaning bus for use in the delivery of passengers and luggage to an aircraft and carrying passengers and luggage away from an aircraft, said bus comprising an elongated self-propelled body formed with a passenger compartment extending over most of the length of said body and an elevatable stairway at one end of said body connected with said passenger compartment, said elevatable stairway being formed with a succession of steps of generally equal width including a distal step remote from said passenger compartment and a succession of other steps between said distal step and said passenger compartment, said distal step being formed with a doorway for said elevatable stairway and said body alignable with a doorway of an aircraft upon elevation of said distal step, said stairway further comprising means for successively raising said steps from said distal step inwardly toward said passenger compartment upon elevation of said distal step, and means on said body shiftable exclusively vertical to align said doorways and thereby elevate said distal step, said body further comprising a luggage compartment extending the full length of said body beneath said passenger compartment and said stairway and having doors for closing said luggage compartment at opposite ends of said body.

10. The bus defined in claim 9 wherein the luggage compartment is formed with means carried by said body for displacing luggage along the length of said compartment.

11. The bus defined in claim 10 wherein said means for displacing luggage is a track, said bus further comprising carriages within said luggage compartment receiving said luggage and riding on said track.

12. The bus defined in claim 10 wherein said means for displacing luggage is a belt-type conveyor.

13. The bus defined in claim 9, further comprising doors spaced along at least one side of said body over the length thereof for affording access to said luggage compartment.

14. The bus defined in claim 9 wherein each of said steps is formed with an annular frame with a width substantially corresponding to the width of the respective step and defining a respective compartment of said stairway.

15. The bus defined in claim 9 wherein each of said steps in a lowered position of said stairway has an upper surface flush with the upper surface of the floor of said passenger compartment.

* * * * *